US010848792B2

(12) United States Patent
Evans

(10) Patent No.: US 10,848,792 B2
(45) Date of Patent: Nov. 24, 2020

(54) SYSTEM AND METHOD FOR PROVIDING AUDIENCE-TARGETED CONTENT TRIGGERED BY EVENTS DURING PROGRAM

(71) Applicant: Maestro Interactive, Inc., Culver City, CA (US)

(72) Inventor: Ari Evans, Los Angeles, CA (US)

(73) Assignee: Maestro Interactive, Inc., Culver City, CA (US)

( * ) Notice: Subject to any disclaimer, the term of this patent is extended or adjusted under 35 U.S.C. 154(b) by 0 days.

(21) Appl. No.: 16/293,065

(22) Filed: Mar. 5, 2019

(65) Prior Publication Data
US 2019/0273954 A1 Sep. 5, 2019

Related U.S. Application Data

(60) Provisional application No. 62/638,726, filed on Mar. 5, 2018.

(51) Int. Cl.
H04N 7/10 (2006.01)
H04N 21/234 (2011.01)
H04N 21/236 (2011.01)
H04N 21/24 (2011.01)
H04N 21/258 (2011.01)
H04N 21/442 (2011.01)
H04N 21/254 (2011.01)

(52) U.S. Cl.
CPC . *H04N 21/23424* (2013.01); *H04N 21/23614* (2013.01); *H04N 21/2408* (2013.01); *H04N 21/254* (2013.01); *H04N 21/25883* (2013.01); *H04N 21/25891* (2013.01); *H04N 21/44204* (2013.01); *H04N 21/44222* (2013.01)

(58) Field of Classification Search
CPC .......... H04N 21/23424; H04N 21/254; H04N 21/44222; H04N 21/44204; H04N 21/25891; H04N 21/25883; H04N 21/2408; H04N 21/23614
USPC ........................................... 725/34
See application file for complete search history.

(56) References Cited

U.S. PATENT DOCUMENTS 6,921,336 B1 * 7/2005 Best ...................... A63F 13/10
463/32
7,712,125 B2 * 5/2010 Herigstad .............. H04N 7/163
725/141

(Continued)

Primary Examiner — Michael B. Pierorazio
(74) Attorney, Agent, or Firm — Dorsey & Whitney LLP

(57) ABSTRACT

A system for providing adjunct content into a video stream based on significant events, audience data, user data, and program content data. The system includes a server configured to host an analyzer and a broadcast engine. The analyzer is configured to receive event data associated with a program and to analyze the event data to detect a triggering event based on detection criteria. In response to detection of the triggering event, the analyzer is configured to select adjunct content to be provided with the program based on selection criteria. The selection criteria includes at least one of a triggering event type of the triggering event or a program content type of the program. The broadcast engine is configured to transmit the selected adjunct content along with program content of the program to a device associated with a user of an audience of the program.

37 Claims, 9 Drawing Sheets

(56) References Cited

U.S. PATENT DOCUMENTS

| | | | | |
|---|---|---|---|---|
| 8,531,050 B2* | 9/2013 | Barney | A63H 30/04 | 290/1 R |
| 8,698,746 B1* | 4/2014 | Merrick | G06F 3/038 | 178/19.05 |
| 8,740,708 B2* | 6/2014 | Karacal | A63F 13/98 | 463/38 |
| 8,830,170 B2* | 9/2014 | Kao | G06F 3/0325 | 345/156 |
| 9,462,340 B1* | 10/2016 | Mathurin | H04N 21/234336 | |
| 9,749,691 B2* | 8/2017 | Cremonesi | H04N 21/252 | |
| 9,918,128 B2* | 3/2018 | Courouge | G06K 9/00302 | |
| 10,171,877 B1* | 1/2019 | Shah | H04N 21/4668 | |
| 10,382,829 B1* | 8/2019 | Panchaksharaiah | H04N 21/435 | |
| 2002/0133562 A1* | 9/2002 | Newnam | G06Q 30/02 | 709/216 |
| 2002/0162120 A1* | 10/2002 | Mitchell | H04N 7/165 | 725/135 |
| 2003/0216177 A1* | 11/2003 | Aonuma | A63F 13/10 | 463/32 |
| 2005/0210502 A1* | 9/2005 | Flickinger | G06Q 30/02 | 725/34 |
| 2006/0041472 A1* | 2/2006 | Lukose | G06Q 30/00 | 705/14.66 |
| 2007/0022437 A1* | 1/2007 | Gerken | H04N 7/17318 | 725/41 |
| 2007/0052177 A1* | 3/2007 | Ikeda | A63F 13/24 | 273/317 |
| 2007/0060391 A1* | 3/2007 | Ikeda | A63F 13/06 | 463/46 |
| 2007/0124756 A1* | 5/2007 | Covell | H04N 5/445 | 725/18 |
| 2007/0124775 A1* | 5/2007 | DaCosta | H04N 7/17318 | 725/62 |
| 2007/0271580 A1* | 11/2007 | Tischer | H04H 60/07 | 725/35 |
| 2008/0082510 A1* | 4/2008 | Wang | H04H 60/37 | |
| 2008/0178241 A1* | 7/2008 | Gilboy | H04N 7/17318 | 725/114 |
| 2009/0067847 A1* | 3/2009 | Nakamura | G08C 23/04 | 398/128 |
| 2009/0163274 A1* | 6/2009 | Kando | A63F 13/10 | 463/31 |
| 2009/0195392 A1* | 8/2009 | Zalewski | G06F 3/012 | 340/573.1 |
| 2009/0249388 A1* | 10/2009 | Seidel | H04N 21/4126 | 725/32 |
| 2010/0192173 A1* | 7/2010 | Mizuki | A63F 13/12 | 725/25 |
| 2010/0199318 A1* | 8/2010 | Chang | H04N 7/17318 | 725/97 |
| 2011/0190052 A1* | 8/2011 | Takeda | A63F 13/02 | 463/31 |
| 2011/0247042 A1* | 10/2011 | Mallinson | G06K 9/00758 | 725/86 |
| 2012/0046767 A1* | 2/2012 | Shimohata | A63F 13/217 | 700/91 |
| 2012/0133582 A1* | 5/2012 | Ohsawa | G06F 3/0308 | 345/157 |
| 2012/0192222 A1* | 7/2012 | Kumar | G06Q 30/0251 | 725/32 |
| 2012/0192228 A1* | 7/2012 | Zito | G06F 16/24578 | 725/34 |
| 2012/0309515 A1* | 12/2012 | Chung | H04N 21/274 | 463/31 |
| 2013/0171897 A1* | 7/2013 | Hsu Tang | B32B 5/20 | 442/76 |
| 2013/0238413 A1* | 9/2013 | Carlson | G06Q 30/0224 | 705/14.25 |
| 2013/0335226 A1* | 12/2013 | Shen | H04R 5/033 | 340/573.1 |
| 2014/0052513 A1* | 2/2014 | Ryan | G06Q 30/0255 | 705/14.16 |
| 2014/0168071 A1* | 6/2014 | Ahmed | H04N 5/23206 | 345/156 |
| 2014/0309511 A1* | 10/2014 | Stal | G16H 50/50 | 600/365 |
| 2015/0121418 A1* | 4/2015 | Jain | H04N 21/812 | 725/32 |
| 2017/0295402 A1* | 10/2017 | Courouge | G06K 9/00302 | |
| 2017/0374414 A1* | 12/2017 | Knox | H04N 21/44218 | |
| 2018/0109828 A1* | 4/2018 | Knox | H04N 21/42201 | |
| 2018/0115802 A1* | 4/2018 | Knox | H04N 21/234 | |
| 2018/0124458 A1* | 5/2018 | Knox | H04N 21/4223 | |
| 2018/0124459 A1* | 5/2018 | Knox | H04N 21/42201 | |

* cited by examiner

SYSTEM AND METHOD FOR PROVIDING AUDIENCE-TARGETED CONTENT TRIGGERED BY EVENTS DURING PROGRAM

CROSS-REFERENCE TO RELATED APPLICATION

This application claims priority to U.S. Provisional Application No. 62/638,726, filed Mar. 5, 2018, entitled SYSTEM AND METHOD FOR PROVIDING AUDIENCE-TARGETED CONTENT TRIGGERED BY EVENTS DURING PROGRAMS, which is incorporated by reference herein, in the entirety and for all purposes.

BACKGROUND

Historically, video content (e.g., television shows and movies) has been delivered the homes of consumers over the air or via a cable or satellite providers that control devices through which the video content is delivered. With the advent of faster Internet speeds, more powerful consumer electronic devices, and increased connectivity between electronic devices, delivery of video content has evolved to allow for new delivery platforms. In addition, consumer behavior related to consuming video content has evolved to include engagement in more interactive ways. One struggle in this evolving landscape related to delivery of video content is related to delivery of advertisements and other interactive content. It has proven difficult to measure effectiveness of an advertisement or interactive content and to determine whether the advertisement or interactive content is reaching a target audience, etc. Improvement in an ability to target advertisements and interactive content toward a particular audience at a particular time may improve a user experience.

DETAILED DESCRIPTION

Figure 1:
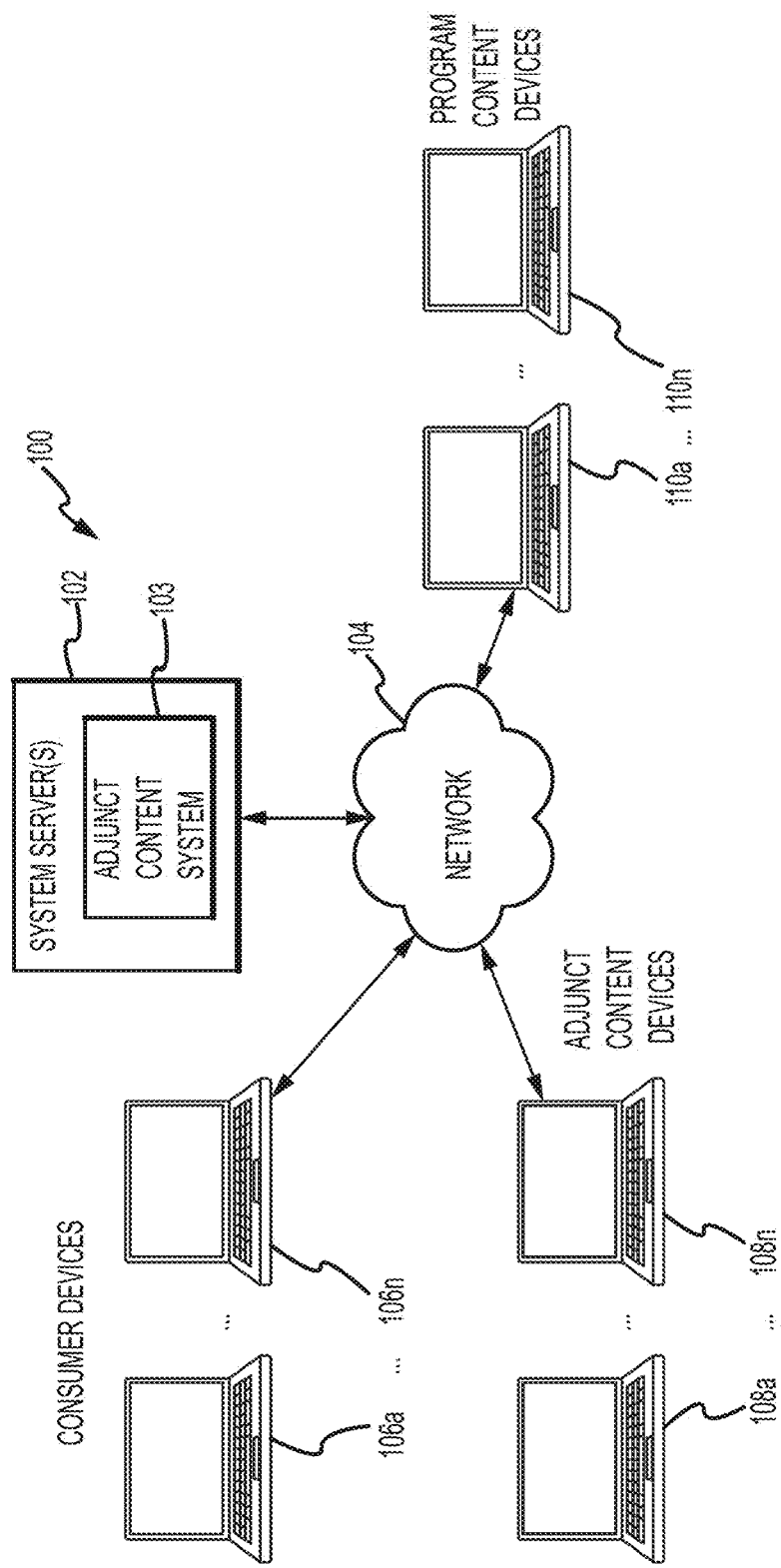
FIG. 1 is a block diagram illustrating a system for program and adjunct content selection and delivery in accordance with embodiments of the disclosure.

Certain details are set forth below to provide a sufficient understanding of embodiments of the disclosure. It will be clear to one skilled in the art, however, that embodiments of the disclosure may be practiced without various aspects of these particular details. In some instances, well-known circuits, control signals, timing protocols, computer system components, and software operations have not been shown in detail in order to avoid unnecessarily obscuring the described embodiments of the disclosure.

This disclosure describes embodiments of a system to provide a more interactive and engaged user experience associated with viewing video content by providing interactive overlays with the video content that are timely and relevant to the video content. The system analyze audience data and video content data in real-time, and using trigger detection algorithms, may detect a trigger event related to the video content that is of some significance. In response to the detection, interactive adjunct content may be selected to be provided with the video content as an overlay using adjunct content selection algorithms when the trigger event is detected. The overlay may be geared to dynamics of the audience to invite increased engagement with the video content. Thus, the system may include content triggering, selection, and delivery features contained with the adjunct-content system to provide the adjunct content with the video content. Through content delivery, the adjunct-content system provides mechanisms for programmatic audience engagement, including detection of levels of user interaction, provision of content to elicit greater user interaction, provision of targeted content to audience segments, trigger provision of the content in response to programmatic events, etc. The adjunct-content system may provide content through which a user viewing an event (e.g., live sporting event, award show, cooking show, fashion show, or any other streamed television-type series or show or movie) via an electronic device (e.g., a computer, mobile/smart/cellular phone, television, or any other electronic device in which a user can view an event) may interact. To select which content to provide and when to provide it, the adjunct-content system may capture statistical data associated with viewership, including any or all of levels of audience engagement (e.g., based on user interaction while viewing program content, such as responding to content (e.g., polls, trivia questions, etc.), chat room activity, etc.) monetization, viewer hours, user-specific (e.g., individual) and segment-based (e.g., groups or segments of users within an audience) user information (e.g., geographic, language, historical preferences, etc.). The adjunct-content system may also monitor the program content to detect triggering events that are used to initiate creation and/or provision of content to various segments of an audience. Triggering events may be based on a broadcaster-provided list of events, historically significant events derived from prior broadcasts of similar events, or combinations thereof. Examples of triggering events may include significant events that occur in a live event (e.g., a scoring play, end of a period/quarter, "big" plays, etc. in a sporting event, important/high-profile awards in an award show, etc.), product placement within the program content (e.g., cookware, clothing, etc.), dramatic event in a streamed television-type series or show or movie, etc. The adjunct-content system may include a data collection engine, an analysis engine, and a triggering event detection engine. The data collection engine may collect audience and user data. The analysis engine may analyze the audience and user data (e.g., both historical and real-time audience and user data) to determine audience engagement/preferences/etc.; create segments of the audience; create, select, or modify content to provide to the audience or segments of the audience; and provide the created/selected/modified content to be sent to the user (e.g., periodically or in response to a triggering event). The triggering event detection engine that monitors program content to detect triggering events.

FIG. 1 is a block diagram illustrating a system 100 for program and adjunct content selection and delivery in accordance with embodiments of the disclosure. With reference to FIG. 1, the system 100 includes one or more servers 102, a network 104, a plurality of viewer devices 106a-106n, a plurality of adjunct-content devices 108a-108n, and a plurality of program-content devices 110a, 110b. Each of the electronic devices may be in communication either directly or indirectly with one another via the network 104. The plurality of program-content devices 110a, 110b provide program content to be viewed by users of the plurality of viewer devices 106a-106n. The plurality of adjunct-content devices 108a-108n provide content to be inserted into the program content that is viewed by users of the plurality of viewer devices 106a-106n, as described further below.

The network 104 provides communication either directly or indirectly to the various devices 102, 106a-106n, 108a-108n, 110a-110n of the system 100. The network 104 may be substantially any type of system or protocol (or combinations of systems and protocols) that provide for data exchange between the devices in the system 100. For example, the network 104 may include Wi-Fi, Bluetooth, cellular networks, Ethernet, or other suitable network systems.

The system server(s) 102 may be any suitable type of computing device, but typically includes one or more computing devices in communication with one another that perform one or more tasks for system 100. In some embodiments, the server(s) 102 is a computing device that hosts a web server application or other software applications that transmits and receives data to and from the viewer devices 106a-106n, the adjunct-content devices 108a-108n, and the program-content devices 110a-110n. The server(s) 102 may typically include one or more processing elements, memory components, and networking/communication interfaces, but may generally have increased processing power and memory storage as compared to the viewer devices 106a-106n. The server(s) 102 is configured to host one or more aspects of the delivery system as discussed herein. The server(s) 102 may include an adjunct content delivery system (e.g., or engine, circuit, etc.) 103.

The viewer devices 106a-106n may include suitable types of computing devices. Some examples include a smartphone, a tablet computer, a digital music player, portable gaming station, laptop computer, desktop computer, set top box, television, wearable devices, virtual reality headset, augmented realty display, media player (e.g., digital video disc player, digital video recorder), or other suitable devices capable of receiving and displaying the program and adjunct content.

The adjunct-content devices 108a-108n and program-content devices 110a-110n may include suitable types of computing devices, which can be substantially similar types as the viewer devices 106a-106n and/or the server(s) 102, or other types of devices capable of storing and transmitting or uploading the adjunct or program content, respectively.

Figure 2:
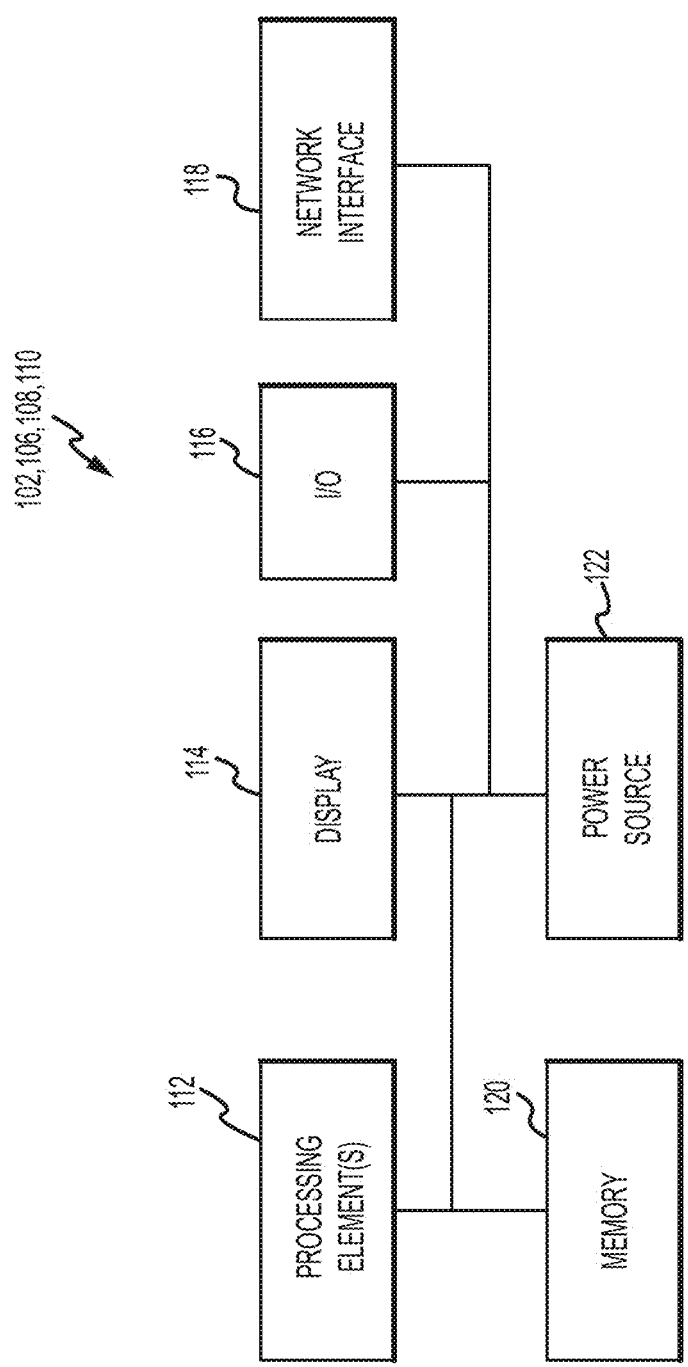
FIG. 2 is a simplified block diagram of a computing device illustrating representative components of the server, the viewer devices, adjunct-content devices, and programmatic-content devices in accordance with embodiments of the disclosure.

FIG. 2 is a simplified block diagram of a computing device illustrating representative typical components of each of the server(s) 102, the viewer devices 106a-106n, the adjunct-content devices 108a-108n, and the program-content devices 110a-110n in accordance with embodiments of the disclosure.

With reference to FIG. 2, the server(s) 102 may include one or more of the components shown in FIG. 2 such as one or more processing elements 112, one or more memory components 120, a display 114, a networking/communication interface 118, an input/output (I/O) interface 116, and a power source 122. It should be noted that FIG. 2 is meant as exemplary only, in other examples the computing devices of the system, e.g., the server(s) 102 and viewer devices 106a-106n, adjunct-content devices 108a-108n, and program-content devices 110a-110n may include fewer or more components than those shown in FIG. 2.

The one or more processing elements 112 may be substantially any electronic device capable of processing, receiving, and/or transmitting instructions. For example, the processing element 112 may be a microprocessor or a microcomputer. Additionally, it should be noted that the processing element 112 may include more than one processing member. For example, a first processing element may control a first set of components and a second processing element may control a second set of components, where the first and second processing elements may or may not be in communication with each other. Additionally, each processing element 112 may be configured to execute one or more instructions in parallel.

The memory 120 stores electronic data that may be utilized by the computing devices 102, 106a-106n, 108a-108n, and 110a-110n. For example, the memory 120 may store electrical data or content e.g., audio files, video files, document files, and so on, corresponding to various applications. The memory 120 may be, for example, non-volatile storage, a magnetic storage medium, optical storage medium, magneto-optical storage medium, read only memory, random access memory, erasable programmable memory, flash memory, or a combination of one or more types of suitable memory components. In many embodiments, the server(s) 102 may have a larger memory capacity than the other devices 106a-106n, 108a-108n, and 110a-110n. The memory may be accessible by any of the devices or a subset of the devices. In some embodiments, the server(s) 102 may include different memory components or different memory sections that store different types of data.

The networking/communication interface 118 receives and transmits data to and from the network 104 to each of the computing devices 102, 106a-106n, 108a-108n, and 110a-110n. The networking/communication interface 118 may transmit and send data to the network 104, and/or other computing devices. For example, the networking/communication interface may transmit data to and from other computing devices through the network 104 which may be a cellular or other wireless network (e.g., Wi-Fi, Bluetooth) or a wired network (e.g., Ethernet), or other suitable network devices, or a combination thereof.

The computing devices 102, 106a-106n, 108a-108n, 110a-110n may also include a power supply 122. The power supply 122 provides power to various components of the computing devices 102, 106a-106n, 108a-108n, and 110a-110n. The power supply 122 may include one or more rechargeable, disposable, or hardwire sources, e.g., batteries, power cord, or the like. Additionally, the power supply 122 may include one or more types of connectors or components that provide different types of power to the computing devices 102, 106a-106n, 108a-108n, and 110a-110n.

The input/output interface 116 allows the computing devices 102, 106a-106n, 108a-108n, and 110a-110n to receive inputs from a user and provide output to the user. For example, the input/output interface 116 may include a capacitive touch screen, keyboard, mouse, stylus, or the like. The type of devices that interact via the input/output interface 116 may be varied as desired.

The display 114 provides a visual output for the computing devices 102, 106a-106n, 108a-108n, and 110a-110n. The display 114 may be substantially any size and may be positioned substantially anywhere on the computing devices 102, 106a-106n, 108a-108n, 110a-110n. For example, if the server(s) 102 includes a screen, the display will typically be a separate component from the server(s) 102 and in communication therewith, whereas the viewer devices 106a-106n may include an integrated display screen. In some embodiments, the display 114 may be a liquid crystal display screen, plasma screen, light emitting diode screen, and so on. In some embodiments, the display 114 may also function as an input device in addition to displaying output from computing device. For example, the display 114 may include capacitive touch sensors, infrared touch sensors, or the like that may capture a user's input to the display 114. In other embodiments, the display 114 may be separate from or otherwise external to the electronic device, but may be in communication therewith to provide a visual output for the electronic device.

The computing devices 102, 106a-106n, 108a-108n, 110a-110n may also include other types of output components, such as speakers or tactile feel devices that provide output to the users. Depending on the type of content, different output components can be used to allow a consumer to consume (e.g., view, listen, or feel) the content.

Figure 3:
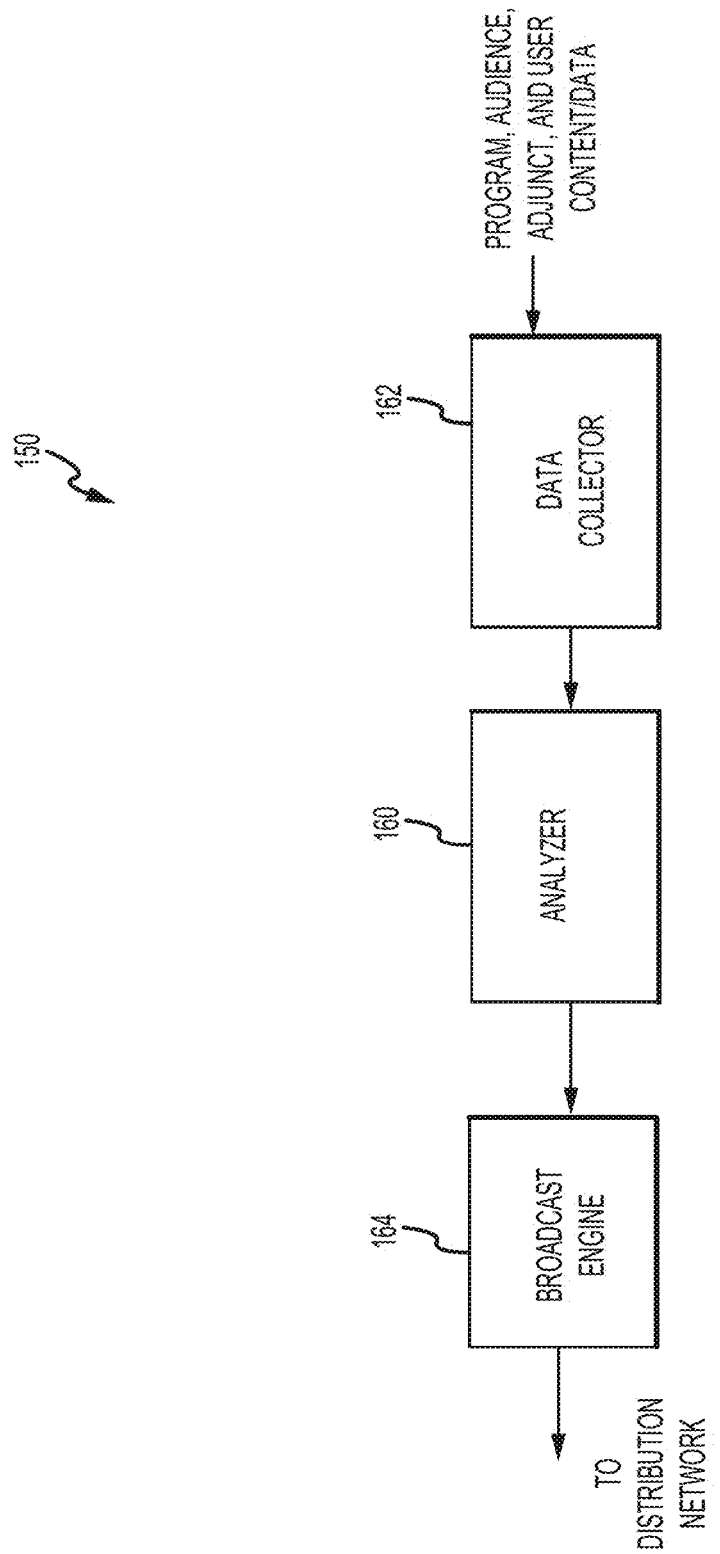
FIG. 3 illustrates a high-level architecture for the system of FIG. 1 in accordance with embodiments of the disclosure.

FIG. 3 illustrates a high level architecture 150 for the adjunct content delivery system 103 of FIG. 1 in accordance with embodiments of the disclosure. With reference to FIG. 3, the architecture 150 includes a plurality of components, which may be portions or standalone software programs that execute within the adjunct content delivery system 103 on the server(s) 102 of FIG. 1. The various components may be used alone or in combination with one another. The components in the architecture 150 can be stored on the memory component 120 and executed by the processing element 112 (or a combination of processing elements and memory components). The architecture 150 includes a data collector 162, an analyzer 160, and a broadcast engine 164. Each of the components of the architecture 150 may be in communication with one another (either directly or indirectly) such that data flows between each of them to allow execution of the method 300 discussed in FIG. 4.

The data collector 162 receives historical metrics and event data. The historical metrics may include metrics calculated based on collected audience engagement data, monetization data, viewership data, audience demographic data, or any combination thereof. The historical metrics may be indicative of effectiveness of the adjunct content type with the triggering event type and/or the program content type, in some examples. The historical metrics may include a score, such as an impact score. The event data may include data/content associated with a program, an audience, users, or any combination thereof. The event data may be used to detect a triggering event associated with the program using detection criteria. The program content may include the actual content of the program (e.g., the video/audio stream information. The user data may be user-specific, and may include used selected preferences and information, or preferences and other information gathered about the user, such as based on historical activity by the user account. The audience data can be based on segments of the audience or the audience as a whole, and the audience can include the users about which user data is being received, or can include similar types of users. The audience data may include viewership, audience activity, programmatic events, based on program content, and viewer hours. The adjunct content and data may include specific advertisement or other adjunct content received from a third party, as well as types of triggering events that are associated with the received specific advertisement or other adjunct content.

The analyzer 160 receives the event data (e.g., associated with the program, audience, and/or users) from the data collector 162. The analyzer 160 also receives program content and at least some adjunct content from the data collector 162. The analyzer 160 monitors the event data to detect triggering events based on the detection criteria. The detection criteria may include various metrics associated with the event data and the program content. The triggering events may be used to initiate creation and/or provision of content to various segments of an audience. Triggering events may be program-related, audience-related, or user-related, for example. Specific examples of ways in which a triggering event is detected may include: real-time user or audience engagement levels, user reactions (e.g., chat, hype meter (e.g., a "global" bar that fills up when users click a button; "hypes" decay over time), Emoji response, something that is part of the broadcast stream (e.g., information detected in audio or video content or embedded as metadata) (e.g., such as song is currently playing, copyrighted movie/film/etc. a segment comes is from, products being shown on screen, which heroes or characters are being used in-game, the emotional state of the person on-screen, number of times person has tried to do X and failed), a pre-configured rule-set (e.g., "If this, then that" pre-defined mappings), input from a human operator (e.g., based on their own perception of what should happen or a "run of show"), manually inserted timestamp markers, or any combination thereof. In some examples, the triggering events based on audience engagement may leverage scores that indicate audience and user based engagement, such as an Impact score described herein.

The determination of which events will be considered to be triggering events may be based on a list of predetermined triggering events. The list of predetermined triggering events may be provided by the program content broadcaster or provider, by the adjunct-content provider, or by another system, such as a known system for selecting and providing advertising information such as based on bidding or another type of market. The list of predetermined triggering events may be generated by analyzer 160, or by another component of the architecture 150, that has analyzed historical events to identify events or types of events that are historically significant, for example in that they historically have been determined to have a statistically significant effect on audience or user engagement or participation. The significant effect can be positive or negative. The analysis of historical events can be based on an analysis of prior occurrences of similar events or types of events during broadcast or other display of similar types of program content. In an embodiment, the analyzer 160 updates the list of events during the displaying of the program content, such as based on historical events that occurred earlier during the display of the program content. Each triggering event can be based solely on statistically significant or otherwise preselected programmatic events, audience events, or user events, or on a combination of two or three thereof or on other suitable events.

The analyzer 160 monitors the program content, audience data, and user data (e.g., the event data) in real time (e.g., live events, such as events currently being displayed in the program content, currently occurring in the audience information, or currently occurring in the live-user information), and determines whether the live event is a triggering event. In some examples, the audience data and/or the user data may be in the form of an impact score associated with the program. In some examples, the analyzer 160 may detect an event, and may determine whether the event is a triggering event. The determination may be based on a score assigned to the event by the analyzer 160. The score may be based on levels of audience engagement (e.g., based on user interaction while viewing program content, such as responding to content (e.g., polls, trivia questions, etc.), chat room activity, etc.) monetization, viewer hours, user-specific (e.g., individual), segment-based (e.g., groups or segments of users within an audience) user information, or combinations thereof.

Examples of program-related triggering events (e.g., triggering event types) may include significant events that occur in a live event (e.g., a scoring play, end of a period/quarter, "big" plays, etc. in a sporting event, important/high-profile awards in an award show, etc.), product placement within the program content (e.g., cookware, clothing, etc.), dramatic event in a streamed television-type series or show or movie, etc. Examples of audience-related triggering events may include events related to audience engagement, such as audience engagement falling below a low threshold or reaching a high threshold). Examples of user-specific triggering events may include events related to actions performed by a user, such as entering a keyword in a chat session or reaching a threshold of continuous viewing time.

In an embodiment, in response to detection of a triggering event, the analyzer 160 creates, selects (e.g., from the adjunct content received from the data collector 162), or modifies (e.g., the adjunct content received from the data collector 162) adjunct content to be provided to an audience, audience segment, and/or user(s) along with the program content based on selection criteria. The selection criteria may include a triggering event type a program content type, audience engagement levels, user data, audience segment data, historical metrics indicating effectiveness of the adjunct content type with the triggering event type or the program content type, or any combination thereof. In some examples, the analyzer 160 may be configured to adjust the selection criteria based on the historical metrics. In some examples, the analyzer 160 may be further configured to determine the historical metrics based on the audience engagement data, the monetization data, the viewership data, the audience demographic data, or any combination thereof. The adjustment may include adjusting (e.g., increasing or decreasing emphasis of) a weight associated with one of the selection criteria based on the historical metrics. Examples of adjunct content types may include raffles, polls, trivia, prediction, commerce (e.g., purchase flows), message, lower third (e.g., image), video (e.g., clip), advertisement (e.g., of various forms), poll/prediction/trivia results, Instagram (e.g., photo), Tweet, email request, chat, stats, brackets, profiles, schedule or combinations thereof. Examples of delivery of the adjunct content may include overlay (timely, shown for up to 2 minutes only to currently present audience when sent), card (e.g., semi-permanent item; can be dismissed by user; appears on page load or when inserted until dismissed by user or removed by admin), panel (e.g., shown alongside video; user can browse among them at will but cannot remove them; admin can manipulate the content), popup/modal, push notification, text message, Email, slack message, or combinations thereof. Selection of a type of adjunct content to be created, chosen, or modified may be further based on effectiveness metrics associated with similar types of adjunct content previously created, chosen, or modified by the analyzer 160 for a similar triggering event. For example, if the triggering event is a scoring play, and historical (e.g., data from within the same program or data collected over multiple programs/broadcasts) use of polls after scoring plays tends to result in less audience participation than use of trivia, then the analyzer 160 may select a trivia adjunct content type over a poll adjunct content type based on the historical metrics. The historical metrics may be presented or consumed in the form of an Impact score.

The analyzer 160 may also select target recipients of the created, selected, or modified adjunct content, such as entire audience, one or more audience segments, individual users, or combinations thereof. The selected target recipients may be based on the trigger type, the created, selected, or modified adjunct content type, other relevant information, or combinations thereof. The analyzer 160 may provide the created, selected, or modified adjunct content with the program content to a distribution network to be provided to the selected target recipients. In some examples, the created, selected, or modified adjunct content may be designed to elicit greater user/audience interaction, provide targeted content to audience segments, etc. The audience segments may be based, for example, on geographic information, language information, participation information (e.g., rooting for team), demographic information, etc. The analyzer 160 may provide adjunct content to be viewed along with or as an interruption to program content such that a user viewing an event (e.g., live sporting event, award show, cooking show, fashion show, or any other streamed television-type series or show or movie) via an electronic device (e.g., a computer, mobile/smart/cellular phone, television, or any other electronic device in which a user can view an event) may interact with the content. To select which content to provide and when to provide it (e.g., immediately after or after a set period after a triggering event, before a commercial, after a commercial, etc.), the analyzer 160 may analyze the statistical data associated with viewership received from the data collector 162, including any or all of levels of audience engagement (e.g., based on user interaction while viewing program content, such as responding to content (e.g., polls, trivia questions, etc.), chat room activity, etc.) monetization, viewer hours, user-specific (e.g., individual) and segment-based (e.g., groups or segments of users within an audience) user information (e.g., geographic, language, historical preferences, etc.).

Some specific examples of data used to determine audience segmentation may include a data collected during a registration or other data collection process (e.g., birthdate, demographic information, location, etc.), historical engagement with overlays, team or interest affinity (e.g., if you share a touchdown overlay for team A, you are likely a fan of team A and will be segmented as such), feature affinity (e.g., users who like to engage with feature Y, e.g. polls or chat), purchasing behavior of this user, demographic and geographic information, friend graph of the user, information received via a third party (e.g., Disney tells system user ABC is part of segment A-1 for purposes of this event broadcast), a "DMP" (data management platform) augments existing user data, user-stated preferences (e.g., settings could allow the user to define some of these parameters themselves, e.g. 'don't show me commerce overlays'), broadcaster-provided metadata specifications (e.g., overlay must go out to everyone, only users of this region, only new users, etc.).

The broadcast engine 164 may provide program content with the selected/created/modified content to an audience, audience segments and/or individual users, as designated by the analyzer 160. The selected/created/modified content may be inserted into program content such that a user viewing an event (e.g., live sporting event, award show, cooking show, fashion show, or any other streamed television-type series or show or movie) via an electronic device (e.g., a computer, mobile/smart/cellular phone, television, or any other electronic device in which a user can view an event) may interact with the content.

Figure 4:
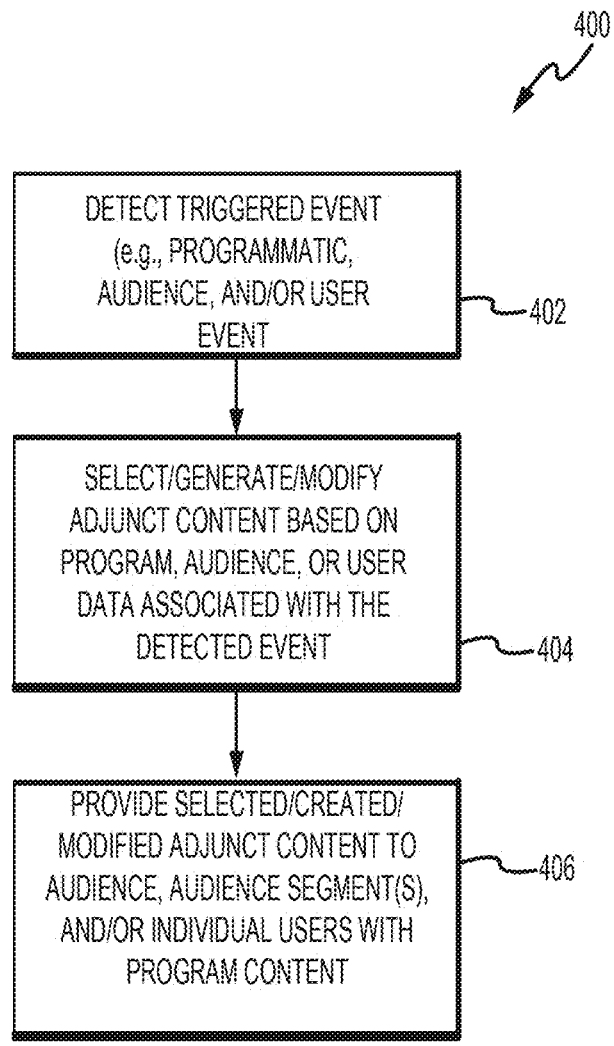
FIG. 4 depicts a flowchart for a method for adjunct-content triggering, selection, and delivery in accordance with embodiments of the disclosure.

FIG. 4 depicts a flowchart for a method 400 for content triggering, selection, and delivery in accordance with embodiments of the disclosure. The method 400 may be performed by the system 100 of FIGS. 1-3. The method 400 includes detecting a triggering event, which may be, for example, a programmatic, audience, and/or user event, at 402, such as by the analyzer 160 of FIG. 3. In some examples, detecting a triggering event may include detecting any event, and determining whether the detected event is a triggering event. A determination as to whether an event is a triggering event may be performed as described with reference to FIGS. 1-3.

The method 400 may further include selecting, generating, and/or modifying adjunct content based on program, audience, or user data associated with the triggering event, at 404, such as by the analyzer 160 of FIG. 3. In other examples, the selecting, generating, and/or modifying content may be periodic to generate new/fresh audience and/or user data. Based on the triggering event information and/or the program and user information, the analyzer 160 detects of levels of user interaction, selections/creates/provides adjunct content to a distribution network to elicit greater user interaction, provides targeted content to audience segments, etc. The audience segments may be based on geographic information, language information, participation information (e.g., rooting for team), demographic information, etc. Selecting which content to provide and when to provide may include analyzing the statistical data associated with viewership data, including any or all of levels of audience engagement (e.g., based on user interaction while viewing program content, such as responding to content (e.g., polls, trivia questions, etc.), chat room activity, etc.) monetization, viewer hours, user-specific (e.g., individual) and segment-based (e.g., groups or segments of users within an audience) user information (e.g., geographic, language, historical preferences, etc.). The method 400 may further include selecting the target recipients of the selected, generated, and/or modified adjunct content. The target recipients may include an entire audience, one or more segments of the audience, select users, or combinations thereof. Selections of the entire audience, one or more segments of the audience, select users, or combinations thereof may be based on the triggering event type, the adjunct content type, or other information relevant to the adjunct content to program content.

The method 400 may further include providing program content with the selected/created/modified content to an audience, audience segments and/or individual users, at 406, such as by the broadcast engine 164 of FIG. 3. The selected/created/modified content may be inserted into program content such that a user viewing an event (e.g., live sporting event, award show, cooking show, fashion show, or any other streamed television-type series or show or movie) via an electronic device (e.g., a computer, mobile/smart/cellular phone, television, or any other electronic device in which a user can view an event) may interact with the content.

Figure 5:
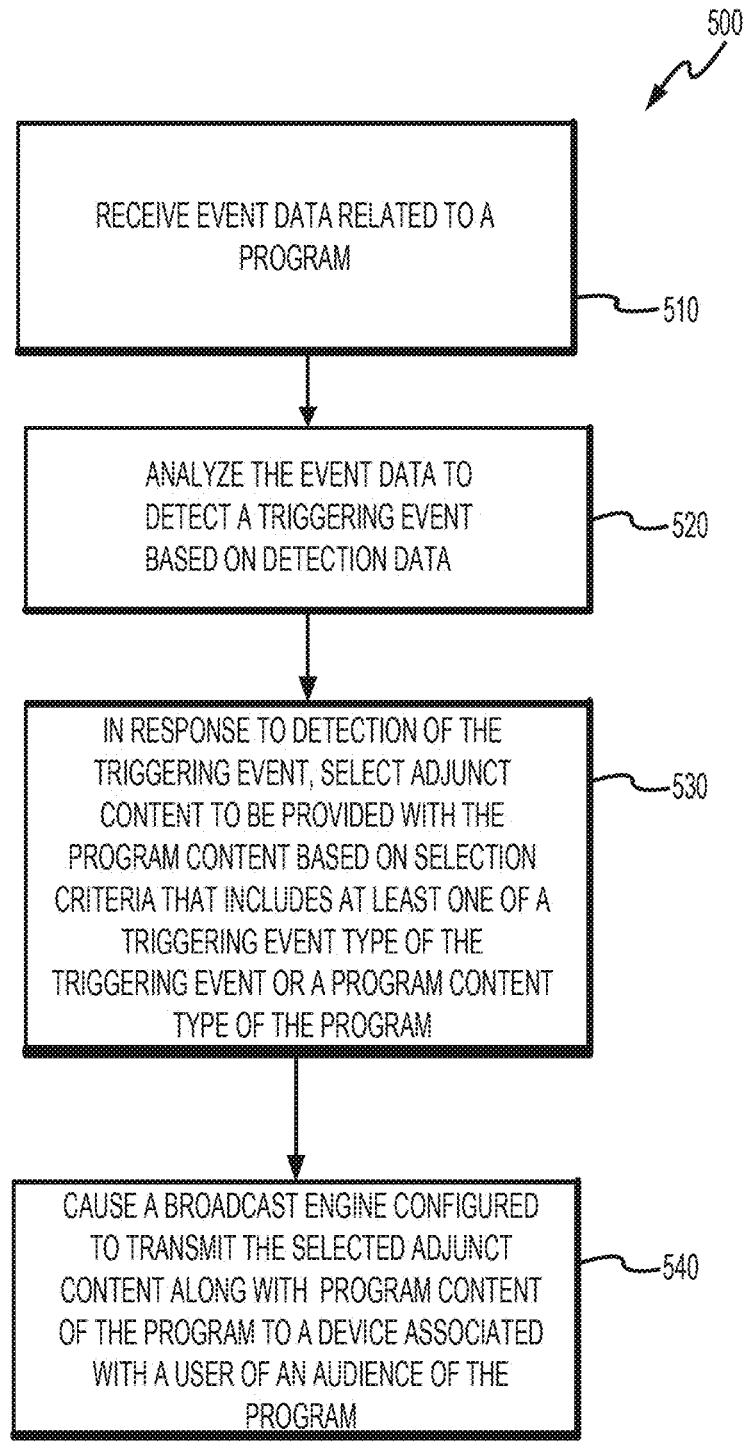
FIG. 5 depicts a flowchart for a method for adjunct-content triggering, selection, and delivery in accordance with embodiments of the disclosure.

FIG. 5 depicts a flowchart for a method 500 for adjunct content selection in accordance with embodiments of the disclosure. The method 500 may be performed by the system 100 of FIGS. 1-3. The method 500 includes receiving receive event data associated with a program, at 510. The event data may be received at an analyzer, such as the analyzer 160 of FIG. 3. In some examples, the event data may include program content of the program and/or audience data of at least part of the audience viewing the program.

The method 500 includes analyzing the event data to detect a triggering event based on detection criteria, at 520. The method 500 includes, in response to detection of the triggering event, select adjunct content to be provided with the program based on selection criteria, at 530. The analysis and selection may be performed by the analyzer, in some examples. In some examples, the program content type includes a sporting event, an award show, a news program, a fashion show, a product announcement, a movie, a television show, or any combination thereof. In some examples, the triggering event type includes a scoring play, a product placement or announcement, discussion of a newsworthy person or event, performance of a particular song, introduction of a particular performer, or any combination thereof.

In some examples, the method 500 includes selecting an adjunct content type based on the triggering event type. Selection of the adjunct content may be further based on the selected adjunct content type. In some examples, the method 500 includes at least one of the selection criteria or the detection criteria based on historical metrics indicating effectiveness of the adjunct content type with the triggering event type or the program content type. For example, an adjustment of the selection criteria and/or the detection criteria may include adjusting a decision criteria weight of the selection criteria and/or the detection criteria based on the historical metrics. In some examples, the method 500 includes determining the historical metrics based on collected audience engagement data, monetization data, viewership data, audience demographic data, or any combination thereof. In some examples, the method 500 includes selecting the adjunct content type based further on whether the adjunct content type was selected for a previous triggering event associated with the program content. In some examples, the adjunct content type includes a poll, a quiz, an offer for purchase of a product or service, a display of statistical information, a display of supplementation information related to the program content, a prompt for social media sharing, or any combination thereof. In some examples, the method 500 includes creating the selected adjunct content based on the triggering event type of the triggering event or the program content type of the program content. In some examples, the method 500 includes modifying the selected adjunct content based on the triggering event type of the triggering event or the program content type of the program content. In some examples, the method 500 further includes detecting the triggering event in response to at least one of the event data indicating audience engagement has fallen below a first threshold or exceeded a second threshold, the event data indicating viewership has fallen below a first threshold or exceeded a second threshold, or the event data indicating an important event has taken place in the content.

The method 500 includes causing a broadcast engine configured to transmit the selected adjunct content along with the program content to a device associated with a user of the audience, at 540. The broadcast engine may include the broadcast engine 164 of FIG. 3, in some examples.

Figure 6:
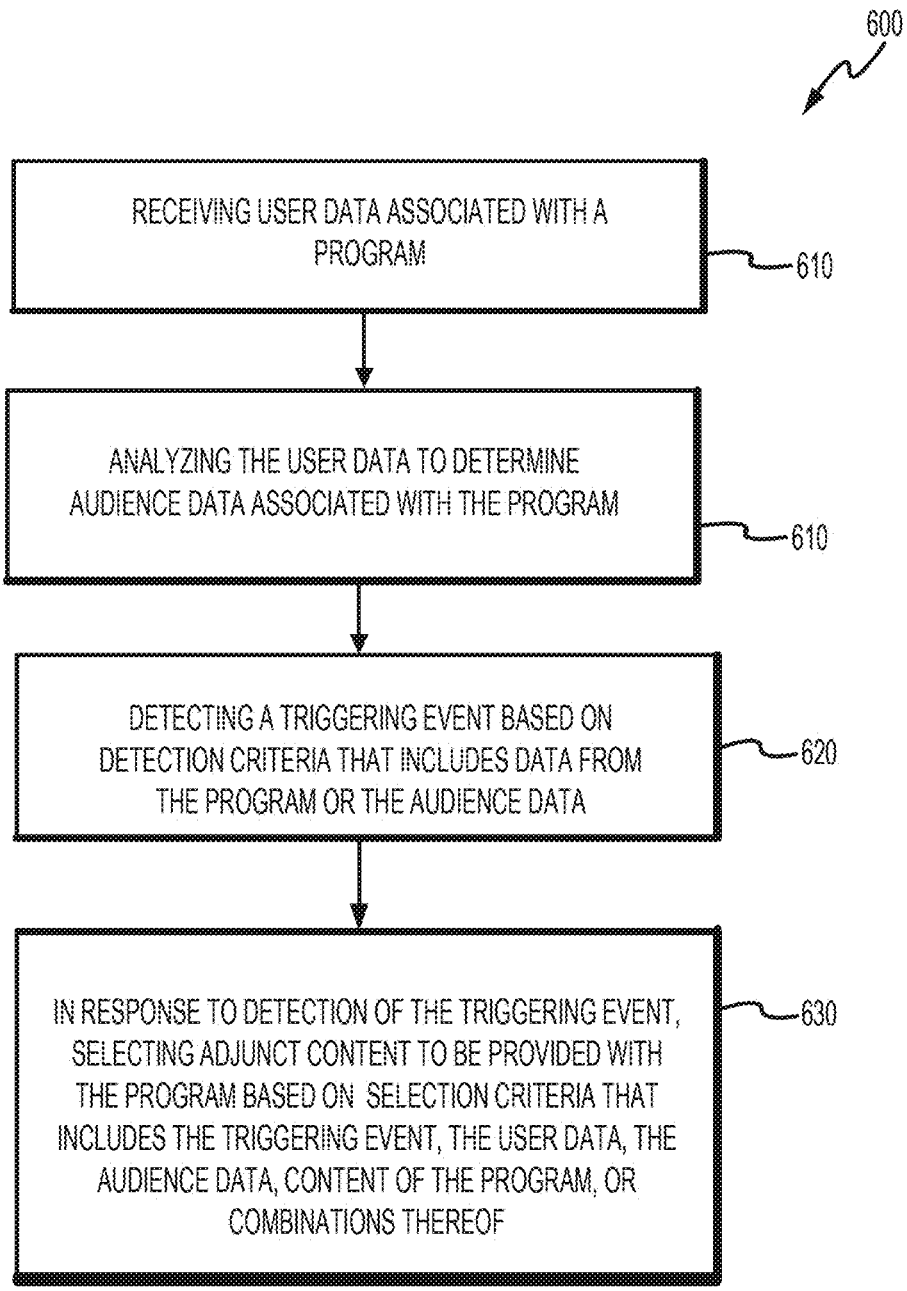
FIG. 6 depicts a flowchart for a method for adjunct-content triggering, selection, and delivery in accordance with embodiments of the disclosure.

FIG. 6 depicts a flowchart for a method 600 for adjunct content selection in accordance with embodiments of the disclosure. The method 600 may be performed by the system 100 of FIGS. 1-3. The method 600 includes receiving user data associated with a program, at 610. The user data may be received at an analyzer, such as the analyzer 160 of FIG. 3. The method 600 includes analyzing the user data to determine audience data associated with the program, at 620. The method 600 further includes detecting a triggering event based on detection criteria that includes data from the program or the audience data, at 630.

The method 600 further includes, in response to detection of the triggering event, selecting adjunct content to be provided with the program based on selection criteria, at 640. The selection criteria may include the triggering event, the user data, the audience data, content of the program, or combinations thereof. In some examples, the method 600 may further include selecting the adjunct content type based further on previous adjunct content provided with the program. In some examples, the method 600 may further include selecting the adjunct content based further on historical metrics indicating effectiveness of the adjunct content with the triggering event or a previous program having content in a genre similar to a genre of the program. In some examples, the method 600 may further include adjusting the selection criteria based on the historical metrics. In some examples, the historical metrics may be based on collected audience engagement data, monetization data, viewership data, audience demographic data, or any combination thereof. In some examples, the method may further include selecting first adjunct content to be provided with the program to a first segment of an audience of the program and second adjunct content to be provided with the program to a second segment of an audience of the program. The first segment and/or the second segment may be determined based on geography, demographics, engagement history, or any combination thereof.

The methods 400, 500, and 600 of FIGS. 4-6, respectively, and/or other software described herein with respect to at least FIGS. 1-3, may be implemented using executable (e.g., using one or more processing units) instructions encoded on one or more non-transitory computer readable media. The one or more processing units may include a central processing unit (CPU), a digital signal processor (DSP), a controller, another hardware device, a firmware device, or any combination thereof. The one or more non-transitory computer readable media may include a magnetic hard disk drive, a solid-state drive, a semiconductor storage device, a read-only memory (ROM), an erasable programmable read-only memory (EPROM), a flash memory, or any other computer-readable storage media that is capable of storing program instructions or digital information.

Specific Examples

Figure 7:
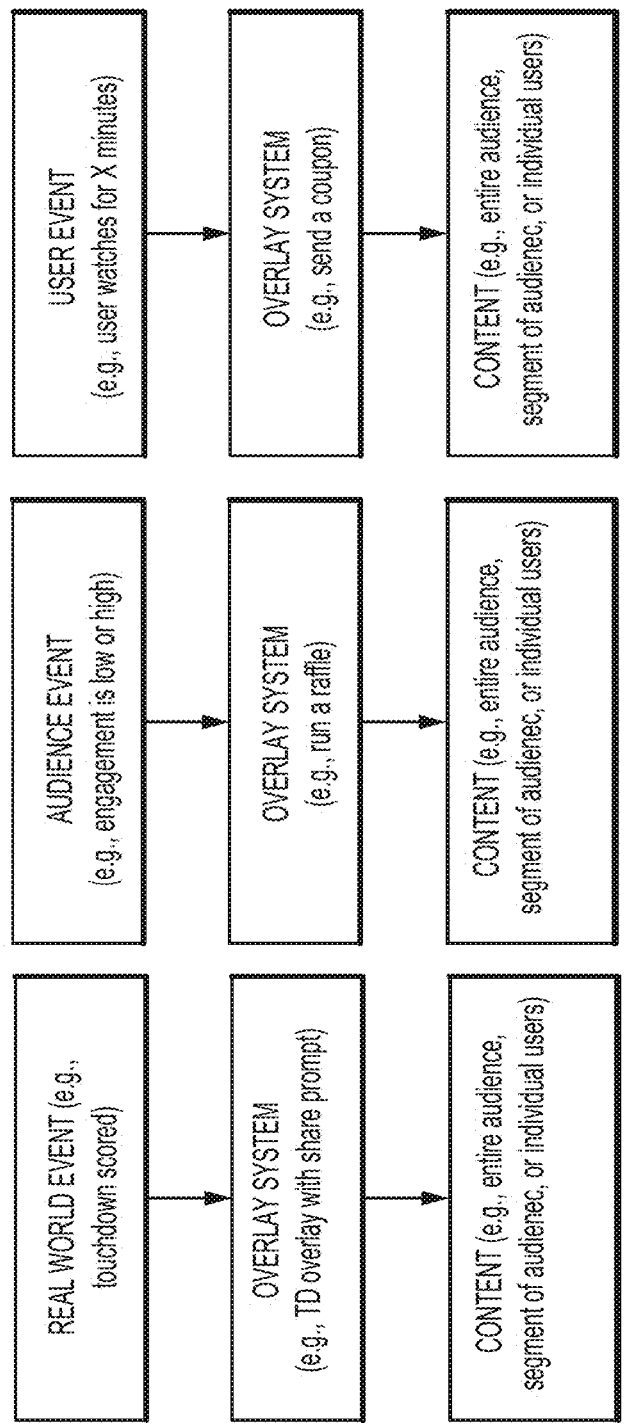
FIGS. 7 and 8 depict flowcharts of specific use cases for the system in accordance with embodiments of the disclosure.
Figure 8:
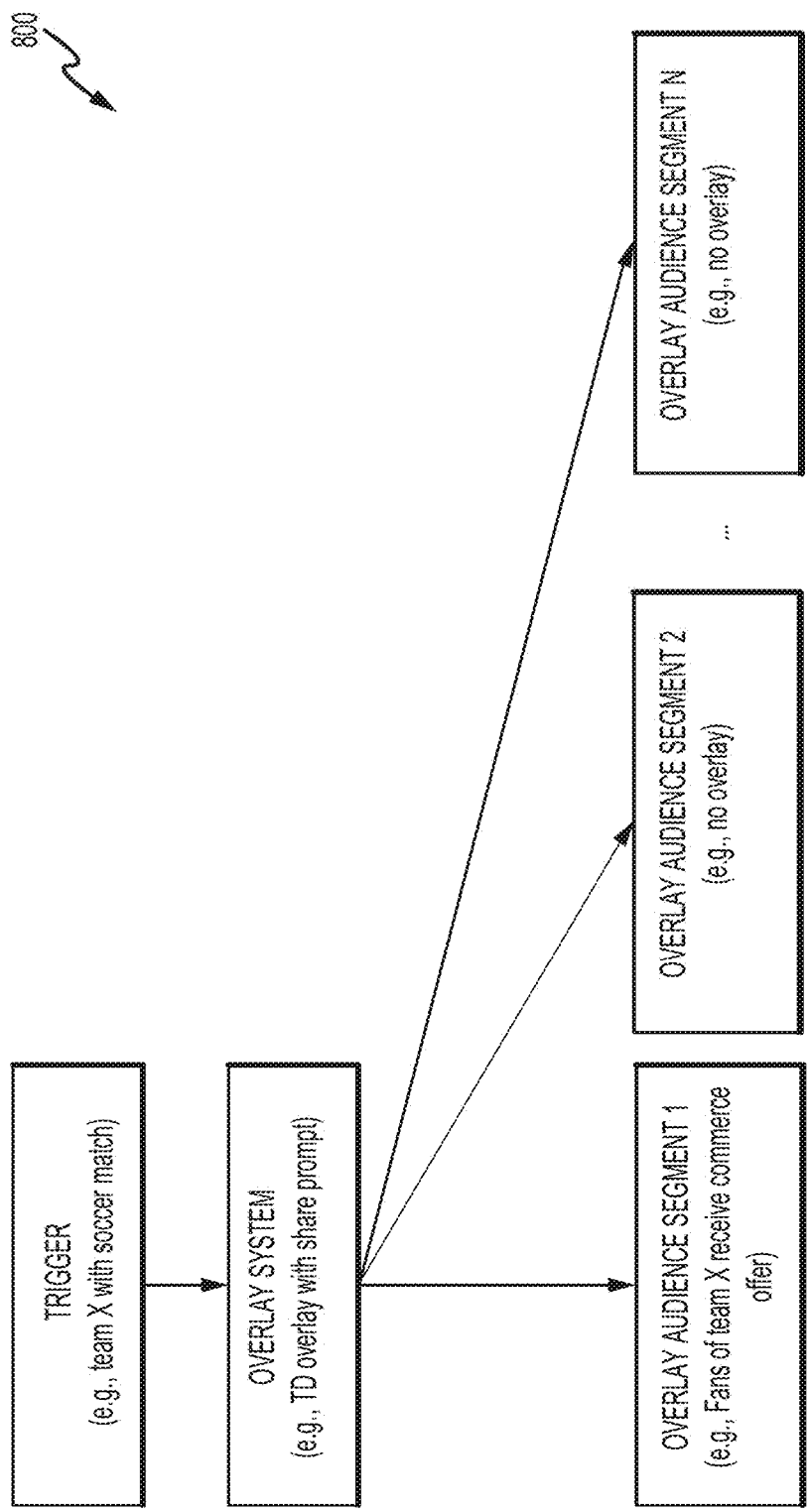

The foregoing description highlights specific use cases to provide better understanding of the adjunct-content system, and is not intended to limit the disclosure. FIGS. 7 and 8 depict specific use cases 700 and 800, respectively, for the adjunct-content system of FIGS. 1-3 in accordance with embodiments of the disclosure. FIG. 7 depicts three different triggering events: programmatic-related, audience-related, and user-related, along with unique, individual responses for those triggering events. FIG. 8 depicts an example of an audience segment use case where content is chosen specific to a particular audience segment, with specific (e.g., or no) content selected for individual audience segments. The analyzer 160 of FIG. 3 may include an (application programming interface) API designed to allow programmatic triggering of insertion of adjunct content into the live stream experience based on user, audience, and programmatic data. The design of the API may provide administrators an ability to automate insertion of adjunct content to provide a more dynamic experience to end-users with reduced manual administrative burden. The adjunct content delivery system may enable a wide variety of new overlay content and delivery methods driven by third party APIs, including stats, in-game data, etc. Each overlay may be recorded in an analytics interface, which may provide a real-time feedback as to effectiveness and audience appeal of the overlay. The feedback may allow for continual optimization of engagement strategies over time.

Figure 9:
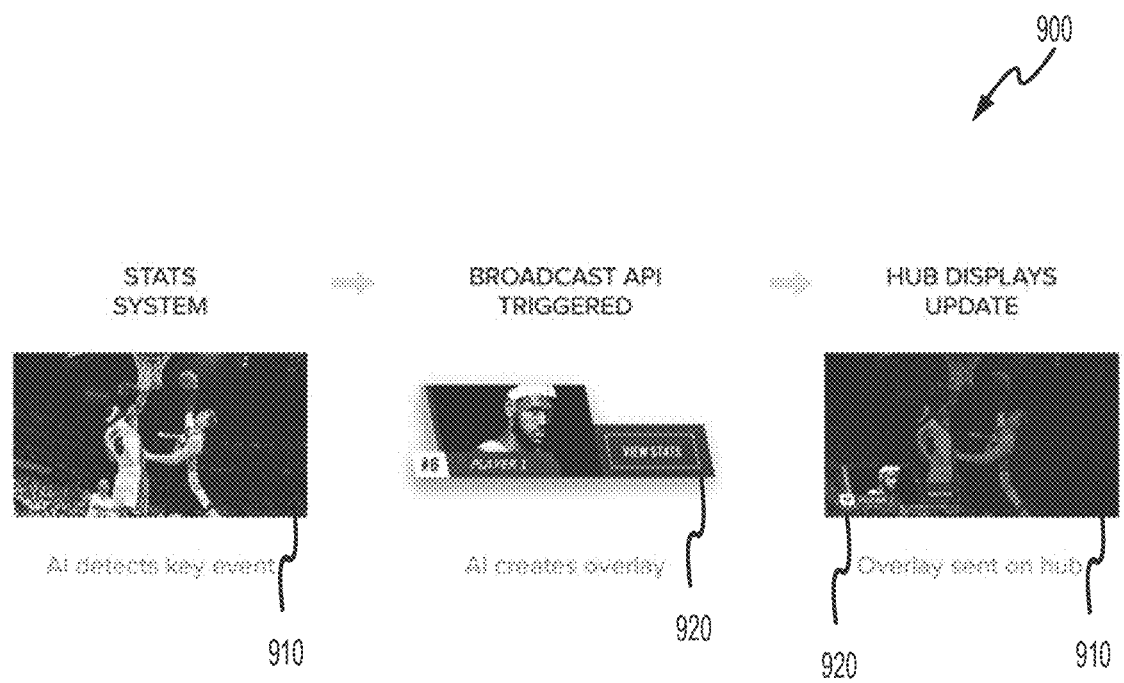
FIG. 9 depicts an exemplary graphic of insertion of adjunct content into program content in accordance with embodiments of the disclosure.

The API may also be used as a foundation for artificial intelligence (AI) (e.g., machine learning) of the analyzer 160 that is designed to improve (e.g., optimize) engagement on a personalized level to each viewer. For example, the AI may detect a triggering event in a program, create an overlay in response to detection of the triggering event, and provide the overly to be displayed with the program. FIG. 9 depicts an exemplary graphic 900 of insertion of adjunct content overlay 920 into program content 910 in accordance with embodiments of the disclosure. Some benefits of this system may include an ability to programmatically elicit audience engagement by triggering generation and provision of the overlay at key moments (e.g., triggering events), creation of a unique interactive experience driven by program data, a reduction in an administrative burden, an ability to enable new content and delivery mechanisms with a real-time feedback to gauge effectiveness, an ability to customize and differentiate experiences, access to new audience-based metrics that provide a more refined picture of audience segments and engagement, etc.

This disclosure includes various examples of programmatic triggering events and adjunct content. Some additional examples may include real-time statistics associated with sports/Esports. For example, a triggering event may be related to a scoring play (e.g., a basket, a run, a goal, a touchdown, etc.) and the adjunct content may include an overlay that depicts the player involved in the scoring play, along with a click through to display live stats alongside the stream. In another example related to the scoring play, the adjunct content may include an overlay that includes a prompt to share the scoring play and/or a prompt for a user to engage in a virtual "cheer". In a football-specific example, a triggering event may include certain down-and-distance combinations (e.g., 15 yards or less on a 3rd or 4th down), and the adjunct content may include an overlay that polls the audience for opinions related to the specific down-and-distance situation (e.g., whether the team should pass or run, punt/kick a field goal or run a play or fake, whether the defense should blitz or not, etc.). In another example, a triggering event may include an end to a game/match/contest, and the adjunct content may include an overlay that prompts fans to share their team's victory. In another example, a triggering event may include a statistical recording being broken, and the adjunct content may include an overlay that informs the audience of information related to the statistical record being broken, including a click through to view information related to the previous statistical record information alongside the stream. In another example related to breaking of a statistical record, the adjunct content may include an overlay that includes a prompt to share the breaking of the statistical record and/or prompt for a user to engage in a virtual "cheer". In another example, a triggering event may include a player making a winning play in a championship (e.g., a championship-winning point, basket, run, hit, goal, touchdown, assist, etc.), and the adjunct content may include an overlay that prompts fans of the player or associated team to buy the player's jersey. In another example, a triggering event may include a statistically interesting scenario (e.g., no team has ever won the game when down 20 points in third quarter), and the adjunct content may include a prompt for a user to make a prediction or a prompt for a user to make real-time bet based on the scenario. In another example related to the a statistically interesting scenario, the adjunct content may include an overlay that displays relevant statistics or data and/or a graphical representation of the relevant statistics or data.

Some additional examples may include events and content associated with music. For example, a triggering event may be related to performance by a performer, of a song, of a type of music, and/or of a particular type of music ensemble, including performing a song, taking the stage, etc. The adjunct content may include an overlay that includes an offer to buy a ticket to a local show related to the performance, a prompt to follow or purchase music (e.g., a song or album) from an artist related to the performance (e.g., on Spotify, Pandora, Apple Music, etc.), or combinations thereof.

Some additional examples may include events and content associated with streamed television-type series or shows. For example, a triggering event may be related to communication of news during a news show, including discussion of a particular news-worthy topic, discussion of particular sources or people associated with a news story, a particular type of news story (e.g., natural disaster). The adjunct content may include an overlay that includes a visualization of the emotional sentiment of the audience based on recent chat messages; an overview of the discussion topic with a click through to learn more via a related article in the panel area; display real-time social media communications from famous, related, and/or involved persons; contact information for related persons, companies, etc., to take some action (e.g., email or call a person, make a donation to a charity, etc.); or combinations thereof.

For a game show, a triggering event may be related to a decision in a contest, and the adjunct content may include an overlay that includes a poll used to determine a result of the contest (e.g., whether a singer voted should be voted on or off of a singing contest). For a game show, a triggering event may be related to the show taking place at or including a discussion of a particular location, and the adjunct content may include an overlay that includes visualization of relevant available flights or travel packages associated with the particular location. For a food-based show, a triggering event may be related to cooking a particular dish, and the adjunct content may include an overlay that includes a listing of the associated recipe or a link to access the recipe.

For award shows or product announcement/demonstration shows, triggering events may include announcement of a new product (e.g., a video game, movie, household item, car, etc.), announcement of nominees or a winner of an award, an action by a participant (e.g., model walking down a runway, actor or singer wearing something noteworthy, and end of the show, etc. The adjunct content may include an overlay that includes an audience poll of nominees for an award, a prompt to provide a thumbs up or thumbs down emoji to a related chat based on the winner or an outfit, a prompt to buy a product or an outfit, a poll for favorite product or event, or any combination thereof.

Some additional examples may include events and content associated with audience engagement or participation. For audience-related triggering events may include a real-time engagement rate falling below or rising above a certain threshold, a rapid shift in audience composition taken place, when a total or average watch time by the collective audience exceeds a threshold, when the collective audience achieves a task (e.g., collectively donate a certain amount of money to a cause), or any combination thereof. The adjunct content may include an overlay that includes a poll, a prompt to make a purchase, an announcement of an audience shift, information associated with a real-time raffle or a gift, a social media sharing prompt, or any combination thereof.

The API may allow for programmatic engagement of audiences during a live stream. The system can interface with other third-party systems to handle triggering events that either add to or modify the user experience or assist interactive storytelling within the broadcast/program. For example, a stats API may indicate a touchdown was scored, and in response, an analysis engine may compute whether the scoring of the touchdown was "significant". In response to the touchdown being significant, the stats API may cause a visual overlay may be created in real-time, and then sent out into the broadcast/program in real time. Thus, the system takes a real-world event and translates it into a digital opportunity for engagement. Examples of types of data that are used to generate the overlays include user-specific data and audience data. User data may include geographic location, spoken languages, favorite or rooting-interest team, engagement history (e.g., whether a user tends to participate in polls, purchases merchandise, etc.), etc. Example of audience data may include historical levels of engagement, current levels of engagement of the audience, peak levels of engagement.

Within the system, the API of the analyzer 160 may send out an overlay to a specific user segment based on any kind of property of behavioral criteria. Personalizing the overlays in real-time may improve user and audience engagement to provide additional or new monetization opportunities (e.g., limiting team-related prompts, such as jersey or ticket sales, to users that are fans of the associated team).

The API of the analyzer 160 may use a scoring system (e.g., an impact score) to detect triggering events and to quantify user and audience based data. An Impact score may track, analyze, and rank audience engagement, monetization, viewership, and viewer hours. The data powering impact scores may be collected at a user-level, and may be aggregated across an entire audience, or across defined segments of the audience. Impact scores associated with adjunct content may indicate effectiveness of the adjunct content in a particular context (e.g., with a particular program type, a particular audience or audience segment, a particular trigger event, etc.).

The analyzer 160 of FIG. 3 may feed previous impact scores (e.g., along with characteristics (e.g., genres, types, etc.) of corresponding adjunct content, program content, triggering event, audience data, etc.) back into an adjunct content selection algorithm as historical metrics to adjust selection criteria of the adjunct content selection algorithm. Similarly, the analyzer 160 of FIG. 3 may also feed previous impact scores (e.g., along with characteristics (e.g., genres, types, etc.) of corresponding adjunct content, program content, triggering event, audience data, etc.) back into an a triggering event detection algorithm as historical metrics to adjust detection (e.g., and/or event significance) criteria of the triggering event detection algorithm. The adjustment of selection criteria of the adjunct content selection algorithm or the triggering event detection algorithm may include adjusting one or more decision criteria weights to emphasize or de-emphasize the importance of certain characteristics. For example, if a particular type of adjunct content tends to result in particularly high (or low) audience engagement for a particular genre (e.g., type) of program, then the fed back impact score may cause the analyzer 160 to emphasize (or de-emphasize) decision criteria weights associated with a combination of the particular type of adjunct content and the particular genre of program. Similarly, if audience engagement for a particular genre (e.g., type) of program is routinely higher (or lower) than an average program, then the fed back impact score may cause the analyzer 160 to emphasize (or de-emphasize) decision weights associated with determining high (or low) audience engagement thresholds. The historical metrics may be limited to data within the same program, or may be applied to many programs in an aggregate over a period of time (e.g., within a season, across two seasons, over the course of a year, multiple years, etc.)

Access to user-level data may enable third party companies and broadcasters to better tailor adjunct content to targeted segments of an audience and/or specific users, which is more efficient than relying on an anonymous view count or broadcasting adjunct content to an entire audience.

Figure 10:
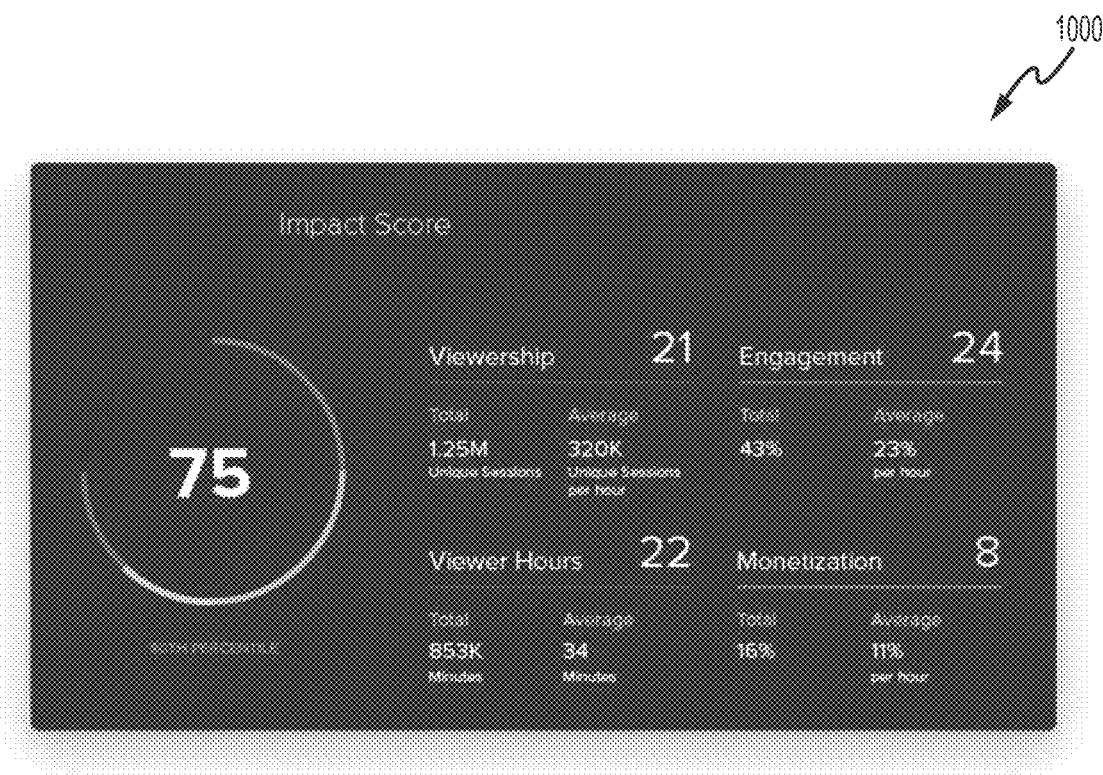
FIG. 10 depicts an exemplary graphic of a particular scoring metric in accordance with embodiments of the disclosure.

Thus, an impact score may be a measure of an event's (e.g., a broadcast's or a program's) performance within adjunct content delivery ecosystem. In some examples, the impact score may include two or more sub-scores and a composite score that includes sub-scores. The two or more sub-scores may carry equivalent weight to determine the composite score, or they may carry different weights. The sub-scores and/or the composite score may be tabulated according to a defined point system to allow comparison across many different events. In a specific example, the composite score may be communicated on a 100 point scale, and may include a combination of four sub-scores (e.g., viewership, engagement, viewer hours, monetization, etc.). Different point scales and a different number of sub-scores may be implemented without departing from the scope of the disclosure. In some examples, the sub-scores may be based on the event's metrics compared to those seen in the adjunct content delivery ecosystem over a specified time period (e.g., the previous twelve months). FIG. 10 depicts an exemplary graphic 1000 of a particular scoring metric (e.g., impact score) in accordance with embodiments of the disclosure. Other graphics or metrics may be used without departing from the scope of the disclosure.

Viewership may be based on a total and/or number viewers for the event. Viewer hours may be based on a total number of minutes viewed by all users and/or an average number of minutes each viewer spent consuming the event. Monetization may be measured as the percentage of the audience who directly transact during the stream using one of the adjunct content delivery system's related features. For example, donations and commerce. In some examples, this calculation may not include passive monetization, e.g., advertising. Engagement may be measured as the percentage of the audience who actively engage during the stream using one of the adjunct content delivery system's related features. Examples of criteria used for engagement may include clicking on overlays, engaging with panels (e.g., sending a chat message), and participating in quests.

Various illustrative components, blocks, configurations, modules, and steps have been described above generally in terms of their functionality. Persons having ordinary skill in the art may implement the described functionality in varying ways for each particular application, but such implementation decisions should not be interpreted as causing a departure from the scope of the present disclosure.

The previous description of the disclosed embodiments is provided to enable a person skilled in the art to make or use the disclosed embodiments. Various modifications to these embodiments will be readily apparent to those skilled in the art, and the principles defined herein may be applied to other embodiments without departing from the scope of the disclosure. Thus, the present disclosure is not intended to be limited to the embodiments shown herein but is to be accorded the widest scope possible consistent with the principles and novel features as previously described.

What is claimed is:

1. A system for providing content to user devices, comprising:
    a server configured to host:
        an analyzer configured to receive event data associated with a program, wherein the analyzer is further configured to analyze the event data to detect a triggering event based on detection criteria, wherein, in response to detection of the triggering event, the analyzer is configured to select first adjunct content to be provided with the program to a first segment of an audience and to select second adjunct content to be provided with the program to a second segment of the audience based on selection criteria, wherein the selected first and second adjunct content is configured for presentation to a respective user of the first and the second segment, respectively, of the audience of the program along with presentation of program content of the program, wherein the selection criteria includes at least one of a triggering event type of the triggering event or a program content type of the program, wherein the first segment of the audience is non-overlapping with the second segment of the audience and the first adjunct content is different than the second adjunct content; and
        a broadcast engine configured to transmit the selected first adjunct content along with the program content of the program to a first device associated with the first user of the first segment of the audience of the program and to transmit the selected second adjunct content along with the program content to a second device associated with the second user of the second segment of the audience of the program.

2. The system of claim 1, wherein the analyzer is further configured to adjust at least one of the selection criteria or the detection criteria based on historical metrics indicating effectiveness of the adjunct content type with the triggering event type or the program content type.

3. The system of claim 2, wherein the analyzer is further configured to adjust a decision criteria weight associated with the at least one of the selection criteria or the decision criteria based on the historical metrics.

4. The system of claim 2, wherein the server is further configured to host a data collector configured to collect audience engagement data, monetization data, viewership data, audience demographic data, or any combination thereof, wherein the analyzer is configured to determine the historical metrics based on the audience engagement data, the monetization data, the viewership data, the audience demographic data, or any combination thereof.

5. The system of claim 1, wherein the server further comprises a memory configured to store existing adjunct content, wherein the analyzer is configured to select some adjunct content of the existing adjunct content to provide the selected first and/or second adjunct content based on the selection criteria.

6. The system of claim 1, further comprising:
the first device configured to receive and display the program content of the program and the selected first second adjunct content; and
a program content server configured to provide the program content of the program, wherein the broadcast engine is configured to receive the program content of the program.

7. The system of claim 1, wherein the program content type includes a broadcast of a real-world event.

8. The system of claim 1, wherein the program content type includes a broadcast of a live, real-world event.

9. The system of claim 8, wherein the triggering event includes a particular event that occurs as part of the live, real-world event.

10. The system of claim 8, wherein, in response to the occurrence of the particular event as part of the live, real-world event, the broadcast engine is configured to transmit the selected first adjunct content along with the program content of the program to a first device associated with the first user of the first segment of the audience of the program contemporaneously with transmission of the selected second adjunct content along with the program content to a second device associated with the second user of the second segment of the audience of the program.

11. The at least one computer-readable storage medium of claim 8, further including instructions that cause the one or more processor units to detect the triggering event based on the occurrence of a particular event that occurs as part of the live, real-world event.

12. The at least one computer-readable storage medium of claim 11, further including instructions that cause the one or more processor units to receive the program having the program type that includes a sporting event, an award show, a news program, a fashion show, a product announcement, a movie, a streamed television-type series or show, or any combination thereof.

13. The system of claim 1, wherein, in response to the triggering event, the broadcast engine configured to transmit the selected first adjunct content along with the program content of the program to a first device associated with the first user of the first segment of the audience of the program contemporaneously with transmission of the selected second adjunct content along with the program content to a second device associated with the second user of the second segment of the audience of the program.

14. At least one non-transitory computer-readable storage medium including instructions that when executed by one or more processor units, cause the one or more processor units to:
receive event data associated with a program;
analyze the event data to detect a triggering event;
in response to detection of the triggering event:
select first adjunct content to be provided with the program to a first segment of an audience based on selection criteria, wherein the first selected adjunct content is configured for presentation to a first user of the first segment of the audience of the program along with presentation of program content of the program, wherein the selection criteria includes a triggering event type of the triggering event or a program content type of the program; and
select second adjunct content to be provided to a second segment of the audience with the program based on the selection criteria, wherein the selected second adjunct content is configured for presentation to a second user of the second segment of the audience of the program along with presentation of program content of the program, wherein the first segment of the audience is non-overlapping with the second segment of the audience and the first adjunct content is different than the second adjunct content; and
cause a broadcast engine configured to transmit the selected first adjunct content along with the program content to a first device associated with the first user of the first segment of the audience of the program and to transmit the selected second adjunct content along with the program content to a second device associated with the second user of the second segment of the audience of the program.

15. The at least one computer-readable storage medium of claim 14, further including instructions that cause the one or more processor units to:
select an adjunct content type based on the triggering event type; and
select the first adjunct content further based on the selected adjunct content type.

16. The at least one computer-readable storage medium of claim 15, further including instructions that cause the one or more processor units to select the adjunct content type based further on whether the adjunct content type was selected for a previous triggering event associated with the program content.

17. The at least one computer-readable storage medium of claim 15, further including instructions that cause the one or more processor units to select the adjunct content type as an overlay on the program content that includes a poll, a quiz, an offer for purchase of a product or service, a display of statistical information, a display of supplementation information related to the program content, a prompt for social media sharing, or any combination thereof.

18. The at least one computer-readable storage medium of claim 14, further including instructions that cause the one or more processor units to adjust at least one of the selection criteria or the detection criteria based on historical metrics indicating effectiveness of the adjunct content type with the triggering event type or the program content type.

19. The at least one computer-readable storage medium of claim 18, further including instructions that cause the one or more processor units to adjust a decision criteria weight associated with the at least one of the selection criteria or the decision criteria based on the historical metrics.

20. The at least one computer-readable storage medium of claim 18, further including instructions that cause the one or more processor units to determine the historical metrics based on collected audience engagement data, monetization data, viewership data, audience demographic data, or any combination thereof.

21. The at least one computer-readable storage medium of claim 14, further including instructions that cause the one or more processor units to create the selected first and/or second adjunct content based on the selection criteria.

22. The at least one computer-readable storage medium of claim 14, further including instructions that cause the one or more processor units to select some adjunct content of existing adjunct content to provide the selected first and/or second adjunct content based on the selection criteria.

23. The at least one computer-readable storage medium of claim 22, further including instructions that cause the one or more processor units to select some adjunct content of existing adjunct content to modify the some adjunct content of the existing adjunct content to provide the selected first and/or second adjunct content based on the selection criteria.

24. The at least one computer-readable storage medium of claim 14, further including instructions that cause the one or more processor units to detect the triggering event in response the event data indicating audience engagement has fallen below a first threshold or exceeded a second threshold.

25. The at least one computer-readable storage medium of claim 14, further including instructions that cause the one or more processor units to detect the triggering event in response to the event data indicating viewership has fallen below a first threshold or exceeded a second threshold.

26. The at least one computer-readable storage medium of claim 14, further including instructions that cause the one or more processor units to receive the program having the program type that includes a sporting event, an award show, a news program, a fashion show, a product announcement, a movie, a streamed television-type series or show, or any combination thereof.

27. The at least one computer-readable storage medium of claim 14, further including instructions that cause the one or more processor units to detect the triggering event based on the triggering event type that includes a scoring play, a product placement or announcement, discussion of a newsworthy person or event, performance of a particular song, introduction of a particular performer, or any combination thereof.

28. The at least one computer-readable storage medium of claim 14, further including instructions that cause the one or more processor units to analyze the event data including at least one of program content of the program or audience data of at least part of the audience viewing the program.

29. The at least one computer-readable storage medium of claim 14, wherein the program content type includes a broadcast of a real-world event.

30. The at least one computer-readable storage medium of claim 14, wherein the program content type includes a broadcast of a live, real-world event.

31. A method, comprising:
receiving user data associated with a program;
analyzing the user data to determine audience data associated with the program;
detecting a triggering event based on detection criteria that includes data from the program; and
in response to detection of the triggering event:
selecting first adjunct content to be provided with the program to a first segment of an audience based on selection criteria, wherein the selected first adjunct content is configured for presentation to a first user of the first segment of the audience of the program along with presentation of program content of the program, wherein the selection criteria includes the triggering event, the user data, the audience data, content of the program, or combinations thereof; and
selecting second adjunct content to be provided to a second segment of the audience with the program based on the selection criteria, wherein the selected second adjunct content is configured for presentation to a second user of the second segment of the audience of the program along with presentation of program content of the program, wherein the first segment of the audience is non-overlapping with the second segment of the audience and the first adjunct content is different than the second adjunct content.

32. The method of claim 31, further comprising adjusting the selection criteria or the detection criteria based on the historical metrics indicating effectiveness of the first and/or second adjunct content with the triggering event or the program.

33. The method of claim 31, further comprising selecting the first segment of the audience based on geography, demographics, engagement history, or any combination thereof.

34. The method of claim 31, wherein the program content type includes a broadcast of a real-world event.

35. The method of claim 31, wherein the program content type includes a broadcast of a live, real-world event.

36. The method of claim 35, further comprising detecting the triggering event based on the occurrence of a particular event that occurs as part of the live, real-world event.

37. The at method of claim 36, further comprising receiving the program having the program type that includes a sporting event, an award show, a news program, a fashion show, a product announcement, a movie, a streamed television-type series or show, or any combination thereof.

* * * * *